US009894597B2

(12) United States Patent
Wang et al.

(10) Patent No.: US 9,894,597 B2
(45) Date of Patent: Feb. 13, 2018

(54) COMMUNICATION METHOD, ACCESS NETWORK DEVICE, AND COMMUNICATION DEVICE USING THE SAME AND COMMUNICATION SYSTEM

(75) Inventors: Guotong Wang, Beijing (CN); Anthony Lee, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 1293 days.

(21) Appl. No.: 13/344,617

(22) Filed: Jan. 6, 2012

(65) Prior Publication Data

US 2012/0178444 A1    Jul. 12, 2012

Related U.S. Application Data

(60) Provisional application No. 61/430,873, filed on Jan. 7, 2011.

(51) Int. Cl.
*H04W 4/00* (2009.01)
*H04W 48/12* (2009.01)
(Continued)

(52) U.S. Cl.
CPC ............ *H04W 48/12* (2013.01); *H04W 48/10* (2013.01); *H04W 84/045* (2013.01)

(58) Field of Classification Search
CPC ............................ H04W 84/045; H04W 92/02
(Continued)

(56) References Cited

U.S. PATENT DOCUMENTS

2010/0124931 A1* 5/2010 Eskicioglu ............ H04W 36/32
455/440
2011/0149878 A1* 6/2011 Ahmadi ................. H04W 8/005
370/329
(Continued)

FOREIGN PATENT DOCUMENTS

CN    101610446    12/2009
CN    101902788    12/2010

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V10.1.0 Release 10, Sep. 2010, pp. 1-192.
(Continued)

*Primary Examiner* — Joshua Schwartz
(74) *Attorney, Agent, or Firm* — Schiff Hardin LLP

(57) ABSTRACT

A communication method, an access network device and a communication device using the same method, and a communication system are proposed. According to an embodiment, the communication method can include following step. An access network device determines whether there is any femto cell within the coverage area thereof. when there is at least one femto cell within the coverage area thereof, the access network device obtains femto cell information of the at least one femto cell; and delivers the femto cell information to at least one terminal device within the coverage area thereof, where the femto cell information includes an indication of the at least one femto cell, at least one femto cell identifier and at least one carrier frequency of the at least one femto cell.

30 Claims, 8 Drawing Sheets

(51) Int. Cl.
*H04W 48/10* (2009.01)
*H04W 84/04* (2009.01)

(58) Field of Classification Search
USPC .............................................. 455/434, 435.1
See application file for complete search history.

(56) References Cited

U.S. PATENT DOCUMENTS

2012/0015649 A1* 1/2012 Li ..................... H04W 36/0061
455/434
2012/0046025 A1* 2/2012 Das ...................... H04W 48/08
455/422.1

OTHER PUBLICATIONS

"3rd Generation Partnership Project;Technical Specification Group Radio Access Network; Evolved Universal Terrestrial Radio Access (E-UTRA); User Equipment (UE) procedures in idle mode", 3GPP TS 36.304 V9.4.0 Release 9, Sep. 2010, pp. 1-32.

"Generation Partnership Project; Technical Specification Group Radio Access Network; Evolved Universal Terrestrial Radio Access (E-UTRA); Radio Resource Control (RRC); Protocol specification", 3GPP TS 36.331 V9.4.0 Release 9, Sep. 2010, pp. 1-252.

"3rd Generation Partnership Project;Technical Specification Group Radio Access Network; User Equipment (UE) procedures in idle mode and procedures for cell reselection in connected mode", 3GPP TS 25.304 V9.3.0 Release 9, Sep. 2010, pp. 1-50.

"3rd Generation Partnership Project; Technical Specification Group Radio Access Network; Radio Resource Control (RRC); Protocol specification", 3GPP TS 25.331 V10.1.0 Release 10, Sep. 2010, pp. 1-1806.

"E-UTRAN—cdma2000 1 HRPD Connectivity and 2 Interworking: Air Interface Specification", 3GPP2 C.S0087-0 V2.0, Jan. 2010, pp. 1-409.

"Support Mobile Idle Handoff from eHRPD to LTE CSG Cells", 3GPP2, Jun. 2008, pp. 1-4.

* cited by examiner

COMMUNICATION METHOD, ACCESS NETWORK DEVICE, AND COMMUNICATION DEVICE USING THE SAME AND COMMUNICATION SYSTEM

CROSS-REFERENCE TO RELATED APPLICATION

This application claims the priority benefits of U.S. provisional application Ser. No. 61/430,873, filed on Jan. 7, 2011. The entirety of the above-mentioned patent application is hereby incorporated by reference herein and made a part of this specification.

BACKGROUND

Field of the Invention

The invention relates to a communication method for interworking between a cellar communication network and closed subscriber group (CSG) cells and, particularly, the invention relates to a communication method, an access network device and a communication device using the same method, and a communication system.

Description of Related Art

Closed subscriber group (CSG) cells (femto cells, also called Home eNodeB) are supported in wireless communication standards such as Third Generation Project Partnership (3GPP) Long Term Evolution (abbreviated as LTE hereinafter). The LTE CSG cells can be deployed with a code division multiple access (CDMA) macro cell coverage. The LTE CSG cells can be energy efficient since its radio service coverage is much smaller than the CDMA macro cell coverage. However, in current CDMA standards such as evolved high rate packet data (eHRPD) specification, the interworking between a CDMA macro cell evolved access network device (eAN) and LTD CSG cells is not supported.

As previously mentioned, the LTE CSG cell coverage area is much smaller than a macro cell coverage area, there might be a lot of LTE CSG cells deployed and being in operation within an eHRPD macro cell coverage. If LTE CSG cells are treated as normal eHRPD macro cell eAN devices, power consumption will be a major issue since an evolved access terminal (eAT) may keep searching for CSG cells within an eHRPD macro cell coverage. Therefore, it is a major concern to develop a communication method for providing an interworking between the eHRPD macro cell eAN and LTE CSG cells.

SUMMARY

The invention is directed to a communication method, an access network device and a communication device using the same method, and a communication system.

According to an embodiment, the invention provides a communication method, which is adapted to an access network device, and includes following steps: determining, at the access network device, whether there is any femto cell within the coverage area of the access network device; when there is at least one femto cell within the coverage area of the access network device, the access network device obtaining femto cell information of the at least one femto cell; and delivering, at the access network device, the femto cell information to at least one terminal device within the coverage area of the access network device, where the femto cell information comprises an indication of the at least one femto cell, at least one femto cell identifier and at least one carrier frequency of the at least one femto cell.

According to an embodiment, the invention provides an access network device. The access network device includes at least a transceiver and a communication protocol module. The transceiver is configured for transmitting signals to and receiving signals from at least one terminal device. The communication protocol module is connected to the transceiver, configured for obtaining femto cell information of the at least one femto cell when there is at least one femto cell within the coverage area of the access network device, and delivering the femto cell information through the transceiver to at least one terminal device within the coverage area of the access network device, where the femto cell information comprises an indication of the at least one femto cell, at least one femto cell identifier and at least one carrier frequency of the at least one femto cell.

According to an embodiment, the invention provides a communication method, which is adapted to a wireless communication device, and includes following steps: reporting that the M2M device is low mobility to a communication network; receiving, at the wireless communication device, femto cell information from an access network device regarding the presence of an allowed femto cell within a coverage area of the access network device; scanning, at the wireless communication device, for the allowed femto cell with a first scanning period when the wireless communication device is within the coverage area of the access network device; and scanning, at the wireless communication device, for the allowed femto cell with a second scanning period when the wireless communication device is moving in proximity of the allowed femto cell, where the second scanning period is greater than the first scanning period.

According to an embodiment, the invention provides a communication device. The communication device includes a transceiver and a communication protocol module. The transceiver is configured for transmitting signals to and receiving signals from an access network device. The communication protocol module is connected to the transceiver, and is configured for receiving femto cell information from the access network device regarding the presence of an allowed femto cell within a coverage area of the access network device, scanning for the allowed femto cell with a first scanning period when the communication device is within the coverage area of the access network device, and scanning for the allowed femto cell with a second scanning period when the communication protocol module detects moving in proximity of the allowed femto cell, where the second scanning period is greater than the first scanning period.

According to an embodiment, the invention provides a communication system. The communication system includes an access network device, at least one terminal device and at least one femto cell. The at least one terminal device is configured for transmitting signals to and receiving signals from the access network device. The at least one femto cell is located within a coverage area of the an access network device, where the access network device assists the at least one terminal device search for an allowed femto cell by delivering femto cell information to the at least one terminal device within the coverage area thereof, and then the at least a terminal device searches for the allowed femto cell according to the femto cell information.

Based upon the aforementioned descriptions, according to the aforementioned embodiments of the invention, there are proposed a communication method, an access network device and a communication device using the same method, and a communication system. Different scanning periods of searching for an allowed femto cell can be adopted depending upon current location of the communication device is within the macro cell coverage area or the femto cell coverage area. Further, with assistance from the access network device which delivers femto cell information relevant to scanning for the allowed femto cell, power consumption of the communication device can be greatly reduced.

Several embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

The invention provides several embodiments which describes communication methods, an access network device and a communication device using the same method, and a communication system. The proposed communication methods are adapted to communication system involved with eHRPD macro cell eANs and LTE CSG cells, and also provides an interworking between the eHRPD macro cells and the LTE CSG cells.

Figure 1:
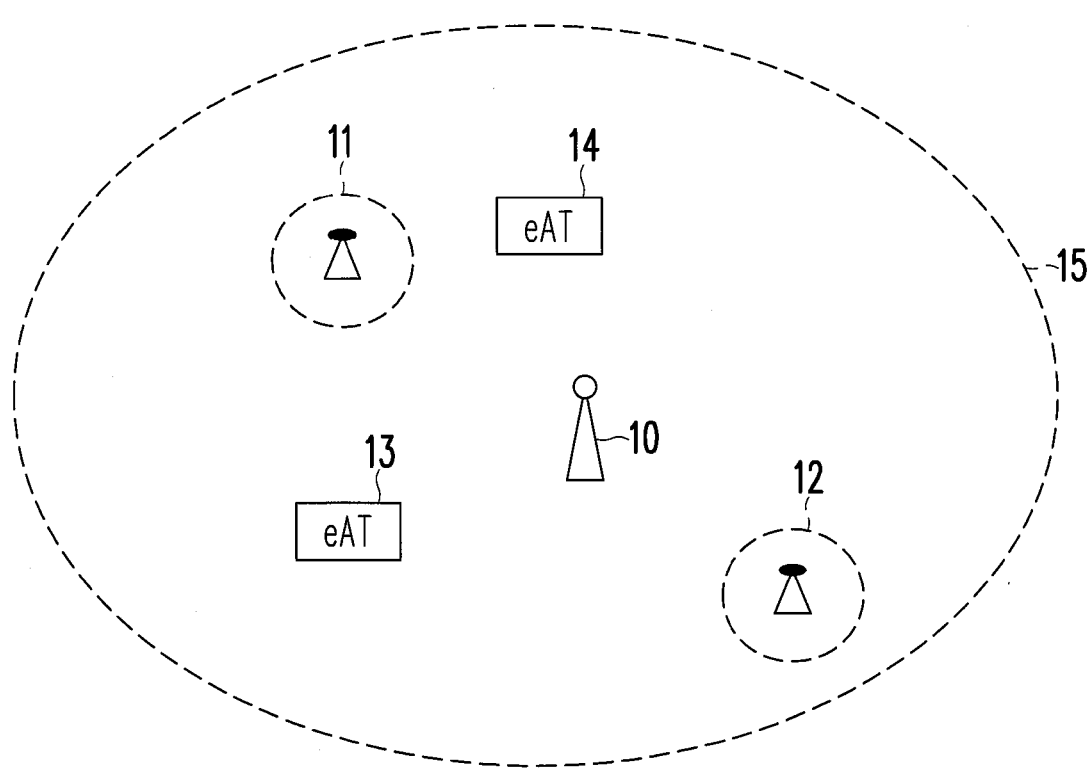
FIG. 1 is a schematic diagram of a communication system according to an exemplary embodiment.

FIG. 1 is a schematic diagram of a communication system according to an exemplary embodiment. Referring to FIG. 1, for example, a communication system includes an eHRPD macro cell access network device (eAN device) 10, and there are at least two LTE CSG cells 11, 12 within the macro cell coverage area 15 of the eHRPD macro cell access network device 10. As shown in FIG. 1, an eAT 13 is a member of the LTE CSG cell 12, and an eAT 14 is a member of the LTE CSG cell 11. As such, in this exemplary example, the eAN device 10 can deliver the LTE CSG cell information related to the LTE CSG cell 12 only to the eAT 13. Similarly, the eAN device 10 can deliver the LTE CSG cell information related to the LTE CSG cell 11 only to the eAT 14.

Figure 2A:
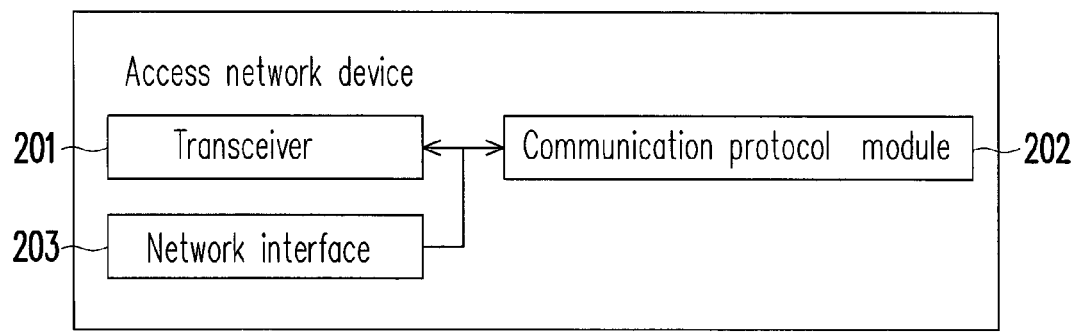
FIG. 2A is a functional block diagram illustrating an access network device according to an exemplary embodiment of the invention.

FIG. 2A is a functional block diagram illustrating an access network device according to an exemplary embodiment of the invention. The access network device 20 includes a transceiver 201, a communication protocol module 202 and a network interface 203. The transceiver 201 and the network interface 203 are both connected to the communication protocol module 202 (abbreviated as CPM 202 hereinafter). The access network device 20 can be, for example, an evolved access network (eAN) device, an access point device, a base station (BS), an advanced base station (ABS), a node B (NodeB) or an evolved NodeB (eNB).

The transceiver 201 is configured for receiving radio signals from one or more wireless terminal devices within its radio coverage area and transmitting radio signals to the wireless terminal devices. In practical implementation, the transceiver 201 can be a transceiver circuit which is connected to an antenna (not shown in FIG. 2A) and configured for performing analog-to-digital signal conversion, digital-to-analog signal conversion, modulation, demodulation, signal amplification, low pass filtering, band pass filtering, and so forth. The transceiver 201 provides the received message (converted from radio signals transmitting by the wireless terminal devices) to the CPM 202, modulates the message from CPM 202 into modulated radio signals, and further transmits the modulated radio signals to the wireless terminal devices.

The access network device 20 can be connected to a wireless communication network, a wired network or a hybrid of wireless and wired communication network through the network interface 203. The CPM 202 thus can obtain information from other network entities in the wireless communication network or the wired network, and the information can include, but not limited to, the deployment location of the LTE CSG cells, the cell IDs of the deployed LTE CSG cells, the carrier frequencies of the deployed LTE CSG cells, the member information of the deployed LTE CSG cells, and so forth. The other network entities in the wireless communication network or the wired network can be server, a database server, or a network controller.

Here, the CPM 202 can be a processor which has built-in protocol stack software or embedded firmware which can perform pre-configured procedures for obtaining and delivering LTE CSG cell information, when the built-in protocol stack software or embedded firmware are executed to by the processor.

Further, the CPM 202 can also deliver LTE CSG cell information for the LTE CSG cells within its radio coverage area to at least one wireless terminal device within its radio coverage area. The detailed technical content on the delivery of the LTE CSG cell information to the at least one wireless terminal device can be referred to exemplary embodiments illustrated in FIGS. 3-8.

Figure 2B:
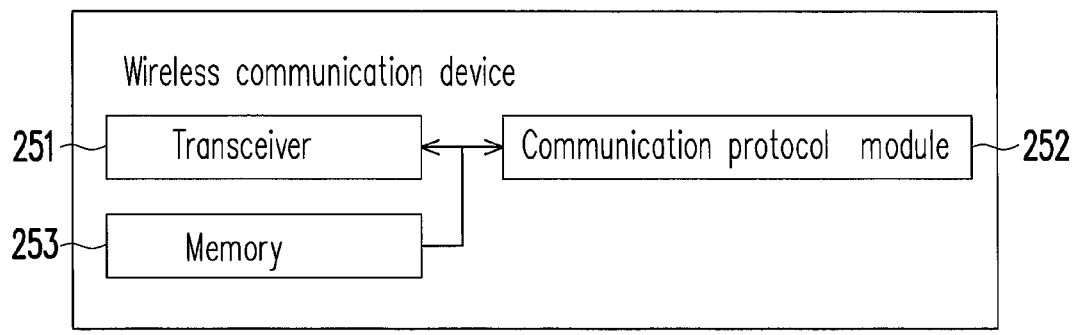
FIG. 2B is a functional block diagram illustrating a wireless communication device according to an exemplary embodiment of the invention.

FIG. 2B is a functional block diagram illustrating a wireless communication device according to an exemplary embodiment of the invention. Referring to FIG. 1 and FIG. 2B, the wireless communication device 25 can be one of eAT 13 and eAT 14. The wireless communication device 25 can be, for example, a wireless terminal device, a user equipment (UE), a mobile station (MS), an advanced mobile station (AMS), an access terminal (AT) or an evolved access terminal (eAT). The wireless communication device 25 includes a transceiver 251, a communication protocol module 252 (abbreviated as CPM 252 hereinafter), and a memory 253. The transceiver 251 and the memory 253 are both connected to the CPM 252. The transceiver 251 is configured for receiving radio signals from an access network device (such as the eAN 10 illustrated in FIG. 1) and transmitting radio signals to the access network device of a communication network. The communication network can be a wireless communication network, a wired network or a hybrid of wireless and wired communication network.

In practical implementation, the transceiver 251 can be a transceiver circuit which is connected to an antenna (not shown in FIG. 2B) and configured for performing analog-to-digital signal conversion, digital-to-analog signal conversion, modulation, demodulation, signal amplification, low pass filtering, band pass filtering, and so forth. The transceiver 251 provides the received message (converted from radio signals transmitted by the communication network) to the CPM 252, modulates the message from CPM 252 into modulated radio signals, and further transmits the modulated radio signals to the access network device in the communication network. Also, the transceiver 251 can be configured for receiving radio signals from a femto cell access device (such as the LTE CSG femto cell device corresponding to the LTE CSG femto cell 12 illustrated in FIG. 1) and transmitting radio signals to the femto cell access device, which is within the radio coverage area of a macro cell access network device.

The CPM 252 is configured for receiving LTE CSG cell information from the access network device. The CPM 252 is also configured to search for/scan for one ore more allowed LTE CSG cells according to the LTE CSG cell information. In practical implementation, the CPM 252 can be a processor, such as a digital signal processor, or a general purpose processor with embedded instruction software code, embedded protocol stack software or embedded firmware, where when the embedded instruction software code, embedded protocol stack software or embedded firmware are executed by the processor in the CPM 252, the aforementioned procedures as well as related procedures illustrated in following FIGS. 5-10 can be performed accordingly.

The memory 253 of the wireless communication device 25 can be configured to store an eAT's CSG whitelist. The CPM 252 can determine whether to start scanning for an allowed LTE CSG cell according to the eAT's CSG whitelist.

The interworking between the eHRPD macro cells and the LTE CSG cells can be implemented by a manual searching approach and a network assisted searching approach (also called an autonomous searching).

In the manual searching approach, an evolved access terminal (eAT) supports manual searching for allowed LTE CSG cell identifiers (IDs). A user determines whether to switch to a pre-determined LTE CSG cell. For example, the user may switch from the eHRPD macro cells to the pre-determined LTE CSG cell after the user arrives home. Since the user knows how far the currently used eAT is from the pre-determined LTE CSG cell at the user's home, the manual searching approach seems to be a more efficient approach to reduce power consumption in terms of searching for any LTE CSG cells. Also, when implementing the interworking between a universal terrestrial radio access (UTRA) and the LTE CSG cells, manual searching shall be supported according to related standards.

If an eAT keeps searching for the LTE CSG cells, power consumption may be very high since there might be a lot of LTE CSG cells with the eHRPD macro cell coverage. Thus, searching for the LTE CSG cells can be more efficient when eHRPD macro cell eAN assists the eAT to search for the LTE CSG cells. In the network-assisted searching approach, the eHRPD macro cell eAN is required to broadcast LTE CSG cells information within its radio coverage area. Also, the eAT is required to have an eAT's CSG whitelist, and there is at least one CSG ID included in the eAT's CSG whitelist. Meanwhile, the eHRPD macro cell of the evolved access network device (eAN) is required to broadcast at least one CSG ID in its broadcast information. When the at least one CSG ID broadcasted by the eHRPD macro cell eAN matches to the at least one CSG ID included in the eAT's CSG whitelist, the eAT can start scanning for the allowed LTE CSG cell corresponding to the matched CSG ID.

In order to support interworking with the LTE CSG cells, the eHRPD macro cell eAN is required to provide related information of the LTE CSG cells. First, an indicator (or an indication of LTE CSG cells) is required to be broadcasted by the eHRPD macro cell eAN to indicate whether there is any LTE CSG cells within the eHRPD macro cell coverage. Secondly, LTE CSG cell IDs or a LTE CSG cell ID range are required to broadcasted by the eHRPD macro cell eAN. It may be better to only broadcast the LTE CSG cell ID range as there might be a lost of LTE CSG cells within the eHRPD macro cell coverage. When the eAT, which receives the broadcasted LTE CSG cell IDs or the broadcasted LTE CSG cell ID range, determines that one of the LTE CSG cell IDs or one LTE CSG cell ID in the broadcasted LTE CSG cell ID range appears to its eAT's CSG whitelist, the eAT determines the LTE CSG cell to an allowed CSG cell and can attempt to scan for the allowed CSG cell, wherein the LTE CSG cell ID range is the scope of the ID number or ID value. Thirdly, the carrier frequency or the carrier frequencies of the LTE CSG cells are required to be broadcasted by the eHRPD macro cell eAN. Thus, the eAT can scan the broadcasted frequency corresponding to the allowed CSG cell. It is noted that the eAT's CSG whitelist may be configured by a user of the eAT or configured during subscription phase.

Delivery of LTE CSG cell information in the eHRPD macro cell coverage area can be broadcast message(s) or specific message(s) transmitted to pre-determined LTE CSG cell members. In the broadcast message(s) approach, all the eATs within the eHRPD macro cell coverage area will receive/read the broadcast message(s) carrying the LTE CSG cell information.

On the other hand, in the specific message(s) approach, the eHRPD macro cell eAN only deliver/transmit the LTE CSG cell information to its pre-determined LTE CSG cell members. The pre-determined LTE CSG cell members are the eATs which have been registered as members of one specific LTE CSG cell.

Figure 3:
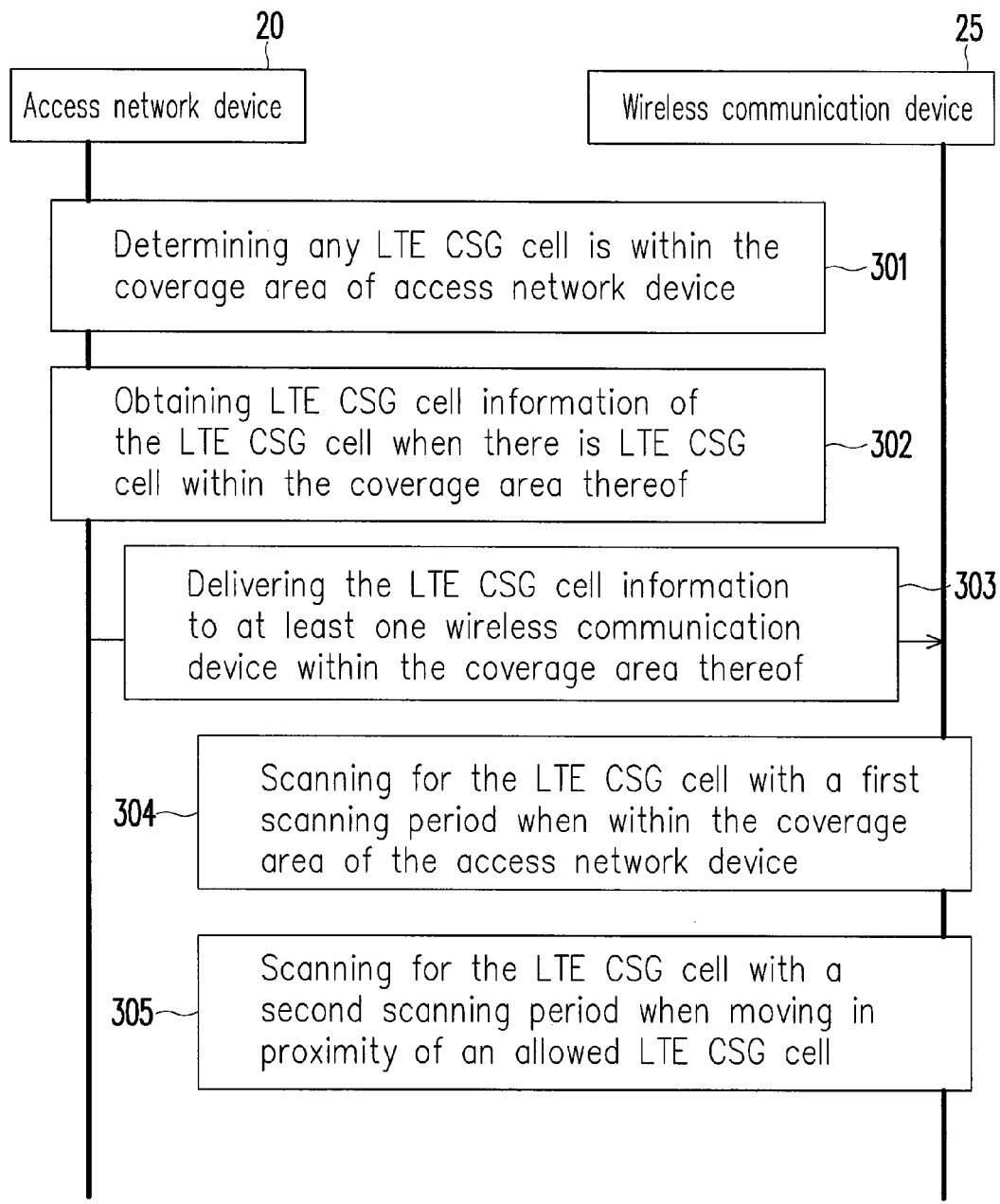
FIG. 3 is a flowchart illustrating a communication method according to an exemplary embodiment of the invention.

FIG. 3 is a flowchart illustrating a communication method according to an exemplary embodiment of the invention. Referring to FIG. 1, FIG. 2A, FIG. 2B and FIG. 3, the communication method is adapted for an eAN device of an eHRPD macro cell, and includes following procedures. In step 301, the CPM 202 of an eAN device 20 determines whether there are any LTE CSG cell(s) within the coverage area of the eAN device 20. In step 302, when there are within the coverage area of the eAN device 20, the CPM 202 of an eAN device 20 obtains LTE CSG cell information of the LTE CSG cell(s) from other network entities in the communication network and the wireless communication network through the network interface 203.

In step 303, the CPM 202 delivers the LTE CSG cell information to at least one eAT within its radio coverage area, where the LTE CSG cell information includes at least an indication of the LTE CSG cell(s), at least one LTE CSG cell ID, and at least one carrier frequency of the LTE CSG cell(s). The at least one LTE CSG cell ID can be one or a plurality of LTE CSG cell IDs or a LTE CSG cell ID range.

In step 304, the CPM 252 of the eAT (such as the wireless communication device 25) starts scanning the LTE CSG cell with a first scanning period T1 through the transceiver 251 when the CPM 252 determines it's currently within the coverage area of the eAN device 20. In step 305, the CPM 252 of the eAT (such as the wireless communication device 25) scans the LTE CSG cell with a second scanning period T2 through the transceiver 251 when the CPM 252 determines it's currently moving in proximity of an allowed LTE CSG cell. The first scanning period T1 is greater than the second scanning period T2.

In other embodiments, before the step 304, the CPM 252 of the wireless communication device 25 within the eHRPD macro cell coverage area of the eAN device 20 can also determine whether any one LTE CSG cell ID in the at least one LTE CSG cell ID appears in its eAT's CSG whitelist. When one LTE CSG cell ID in the at least one LTE CSG cell ID appears in its eAT's CSG whitelist, the LTE CSG cell corresponding to the LTE CSG cell ID can be determined to be the allowed LTE CSG cell by the CPM 252. Subsequently, the CPM 252 can scan the at least one carrier frequency delivered from the eAN device 20 when at least one LTE CSG cell ID in the at least one LTE CSG cell ID appear in its eAT's CSG whitelist, in order to search for the allowed LTE CSG cell(s).

In the present embodiment, the CPM 202 of the eAN device 20 can obtain member configuration information of each one of the LTE CSG cell(s). Also, in the step 303, the CPM 202 of the eAN device 20 can only deliver the LTE CSG cell information to the eAT(s) which are member(s) of the LTE CSG cell. For example, suppose there are two LTE CSG cells deployed within the eHRPD macro cell coverage area, the CPM 202 of the eAN device 20 can only deliver the LTE CSG cell information (corresponding to a first LTE CSG cell) to a first group of eAT(s) which are member(s) of the first LTE CSG cell and can only deliver the LTE CSG cell information (corresponding to a second LTE CSG cell) to a second group of eAT(s) which are member(s) of the second LTE CSG cell. In some cases, the first group and the second group of the eAT(s) may be overlapped but the present invention is not limited thereto. Alternatively, in the step 303, the CPM 202 of the eAN device 20 can broadcast the LTE CSG cell information to all of the eAT(s) within its radio coverage area.

There are some proposed exemplary embodiments for the broadcast message(s) approach, and proposed at least one exemplary embodiment for the specific message(s) approach.

Figure 4:
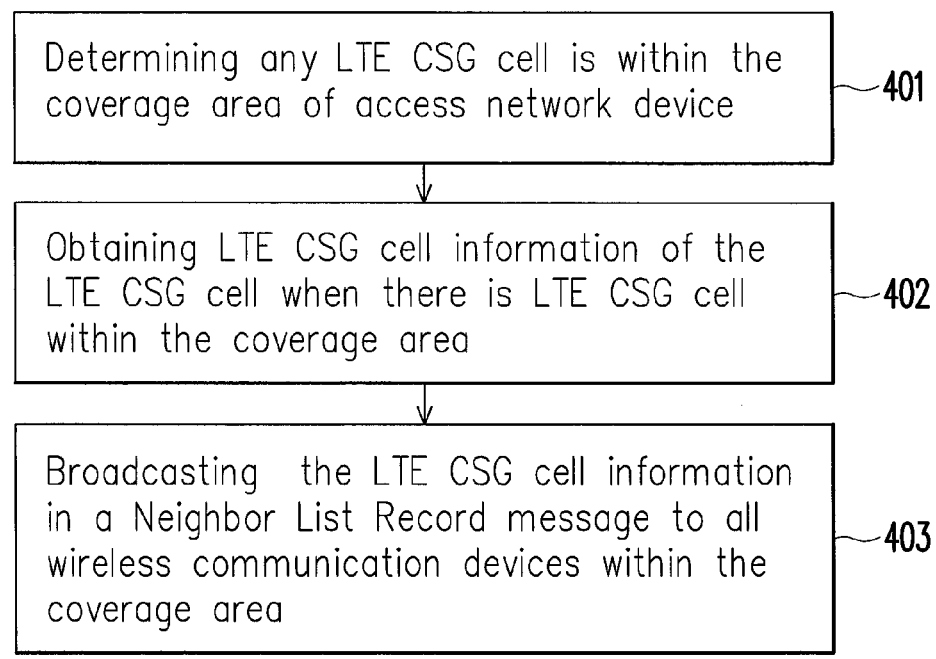
FIG. 4 is a flowchart illustrating a communication method for delivering LTE CSG cell information according to a first exemplary embodiment of the invention.

FIG. 4 is a flowchart illustrating a communication method for delivering LTE CSG cell information according to a first exemplary embodiment of the invention. Referring to FIG. 1, FIG. 2A and FIG. 4, the proposed communication method includes: the CPM 202 of the eAN device 20 determines whether there are any LTE CSG cells in its radio coverage area (step 401); the CPM 202 obtains LTE CSG cell information of the LTE CSG cell(s) when there is LTE CSG cell within the coverage are of the eAN device 20 (step 402); the CPM 202 determines to broadcast all LTE CSG information in an evolved UTRAN (E-UTRAN) Neighbor List Record message to all wireless communication devices within its coverage are (step 403). It is noted that the E-UTRAN Neighbor List Record message can be contained in an OtherRATNeighborList message as specified in eHRPD specification, where the RAT refers to radio access technology. Also, the LTE CSG information broadcasted in the step 403 includes at least three parameters such as LTECSGInfoIncluded, LTECSGIDRange, and LTECSGEARFCN.

The parameter LTECSGInfoIncluded can indicate whether there are any LTE CSG cells within the radio coverage area of the eAN device 20. When there is a plurality of LTE CSG cells, the parameter LTECSGIDRange can indicate the range of the LTE CSG cells. The parameter LTECSGEARFCN provide carrier frequency information for the LTE CSG cells. In practical implementation, the E-UTRAN Neighbor List Record message can contain following fields shown in Table I.

TABLE I

| CSG cell information | |
| --- | --- |
| Field | Length (bits) |
| LTECSGInfoIncluded | 1 |
| LTECSGIDStart | 0 or 9 |
| LTECSGIDRange | 0 or 9 |
| LTECSGEARFCN | 0 or 16 |
| MeasurementBandwidth | 0 or 3 |

In Table I, if there are LTE CSG cells within the eHRPD macro cell coverage area, the eAN device 20 can set the parameter (field) LTECSGInfoIncluded to "1"; otherwise, the eAN device 20 can set the parameter LTECSGInfoIncluded to "0". The eAN device 20 can set the parameter (field) LTECSGIDStart to "0", and when the parameter LTECSGIDStart is set to "0", the eAN device 20 can omit this field; otherwise, the eAN device 20 can set the parameter LTECSGIDStart to a starting value of the LTE CSG cell ID. The eAN device 20 can set the parameter (field) LTECSGIDRange to "0", and when the parameter LTECSGIDRange is set to "0", the eAN device 20 can omit this field; otherwise, the eAN device 20 can set the parameter LTECSGIDRange to the range of the LTE CSG cell ID as specified in 3GPP Technical Specification (TS) 36.331.

In Table I, the eAN device 20 can set the parameter (field) LTECSGEARFCN to "0", if the parameter LTECSGEARFCN is set to "0", the eAN device 20 can omit this field; otherwise, the eAN device 20 can set the parameter LTECSGEARFCN to the E-UTRA Absolute Radio Frequency Channel Number (EARFCN) of the LTE CSG cell. Further, the parameter LTECSGEARFCN provides only a center frequency of the carrier frequency, thus the parameter (field) MeasurementBandwidth should be used along with the parameter LTECSGEARFCN to indicate a Transmission bandwidth configuration for the LTE CSG cell. For example, if the LTECSGEARFCN is set to "1", the eAN device 20 can set the parameter MeasurementBandwidth as specified in 3GPP TS 36.104; otherwise, the eAN device 20 can omit this field.

Figure 5:
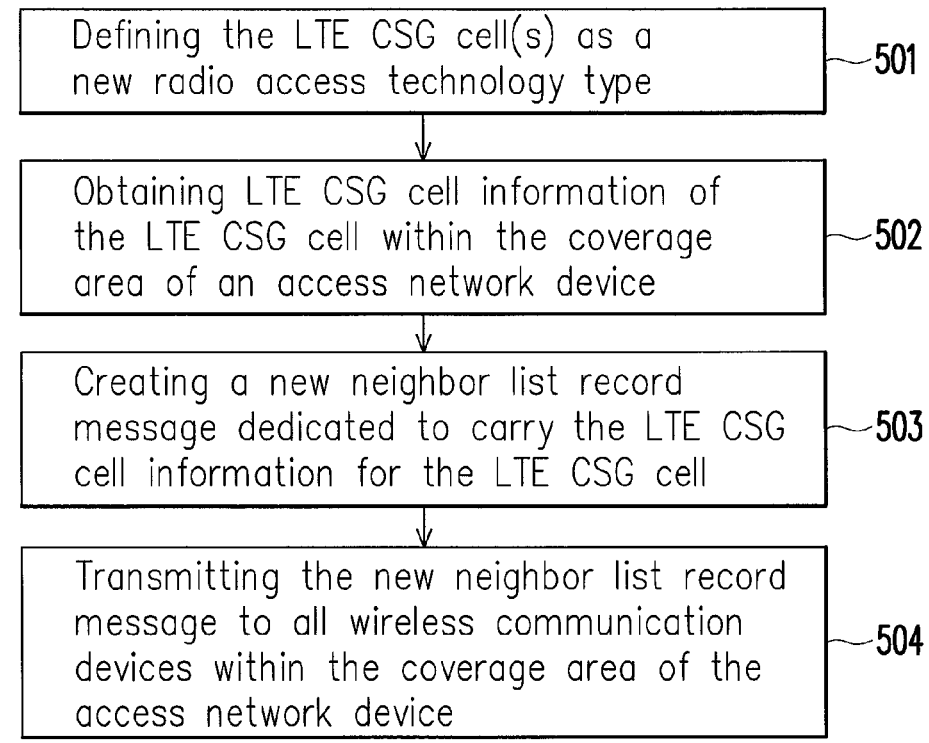
FIG. 5 is a flowchart illustrating a communication method for delivering LTE CSG cell information according to a second exemplary embodiment of the invention.

FIG. 5 is a flowchart illustrating a communication method for delivering LTE CSG cell information according to a second exemplary embodiment of the invention. Referring to FIG. 1, FIG. 2A and FIG. 5, the proposed communication method includes: the CPM 202 of the eAN device 20 defines LTE CSG cell as a new RAT type (step 501); the CPM 202 obtains LTE CSG cell information of the LTE CSG cell(s)

when there is LTE CSG cell within the coverage are of the eAN device 20 (step 502); the CPM 202 creates a new message, a LTE CSG Neighbor List Record message, which is dedicated to carry LTE CSG information for the LTE CSG cells in the radio coverage area of the eAN (step 503); and the CPM 202 transmits the LTE CSG Neighbor List Record message to all wireless communication devices within its coverage area (step 504).

In the step 503, the LTE CSG information can include the at least three parameters such as LTECSGInfoIncluded, LTECSGIDRange, and LTECSGEARFCN. Also, the new message LTE CSG Neighbor List Record can be contain in the OtherRATNeighborList message as specified in eHRPD specification. Further, in the step 501, a new RAT type is defined as the LTE CSG cell system. For example, a RAT type parameter, RATType=0001 may be used to refer to the LTE CSG cell. Also, the message LTE CSG Neighbor List Record can also be used to carry LTE CSG cell information as shown in Table I.

Figure 6:
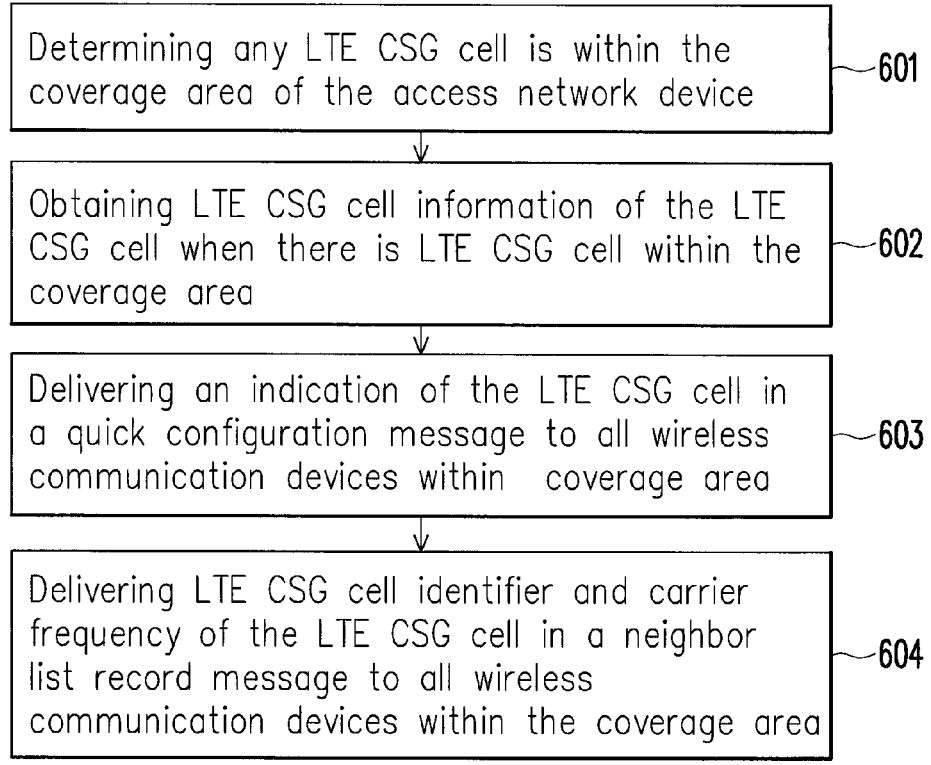
FIG. 6 is a flowchart illustrating a communication method for delivering LTE CSG cell information according to a third exemplary embodiment of the invention.

FIG. 6 is a flowchart illustrating a communication method for delivering LTE CSG cell information according to a third exemplary embodiment of the invention. Referring to FIG. 1, FIG. 2A and FIG. 6, the proposed communication method includes: the proposed communication method includes: the CPM 202 of the eAN device 20 determines whether there are any LTE CSG cells in its radio coverage area (step 601); the CPM 202 obtains LTE CSG cell information of the LTE CSG cell(s) when there is LTE CSG cell within the coverage are of the eAN device 20 (step 602); the CPM 202 adds an indicator LTECSGAvailable in a QuickConfig message and delivers the QuickConfig message to all wireless communication devices within its coverage area (step 603); the CPM 202 adds frequency and a range of the LTE CSG IDs in the E-UTRAN Neighbor List Record message, and delivers the E-UTRAN Neighbor List Record message to all wireless communication devices within its coverage area (step 604).

Alternatively, the eAN device 20 may define a new message to carry the frequency and the range of the LTE CSG IDs, and the new message can have corresponding fields as those shown in Table I.

The QuickConfig message is an eHRPD system configuration message broadcasted by the eAN. Also, if the eAN device 20 defines a new message LTECSGNeighborList but the new message LTECSGNeighborList is not contained in the OtherRATNeighborList, the eAN device 20 is required to further define a transmission cycle of the new message LTECSGNeighborList in the QuickConfig message. The third embodiment provides an option to transmit the LTE CSG information in a different transmission cycle than that of the LTE macro cell information (or eHRPD macro cell information). For example, the eAN device 20 can broadcast the LTE macro cell information in a relatively shorter transmission cycle and broadcast the LTE CSG cell information in a relatively longer transmission cycle.

In practical implementation, the QuickConfig message contain following fields shown in Table II.

TABLE II

CSG cell information

| Field | Length (bits) |
|---|---|
| LTECSGAvailable | 0 or 1 |
| LTECSGTxCycke | 0 or 3 |
| LTECSGSignature | 0 or 6 |

In Table II, when the parameter (field) LTECSGAvailable is included in the QuickConfig message, the eAN device 20 can set the parameter LTECSGAvailable to "1" if the LTE CSG information in the E-UTRAN Neighbor List Record or the LTE CSG Neighbor List Record. Otherwise, the eAN device 20 can set the parameter LTECSGAvailable to "0".

In Table II, if the eAN device 20 defines the new message LTECSGNeighborList to carry the LTE CSG information, the eAN device 20 is required to add the parameters (fields) LTECSGTxCycle and LTECSGSignature as shown in Table II. If the eAN device 20 sends the new message LTECSGNeighborList, the eAN device 20 can set the parameter LTECSGTxCycle to indicate a transmission cycle of the new message LTECSGNeighborList; otherwise, the eAN device 20 can omit the fields LTECSGTxCycle. The parameter (field) LTECSGSignature is used to indicate the signature of the next LTECSGNeighborList the eAN will transmit.

Figure 7:
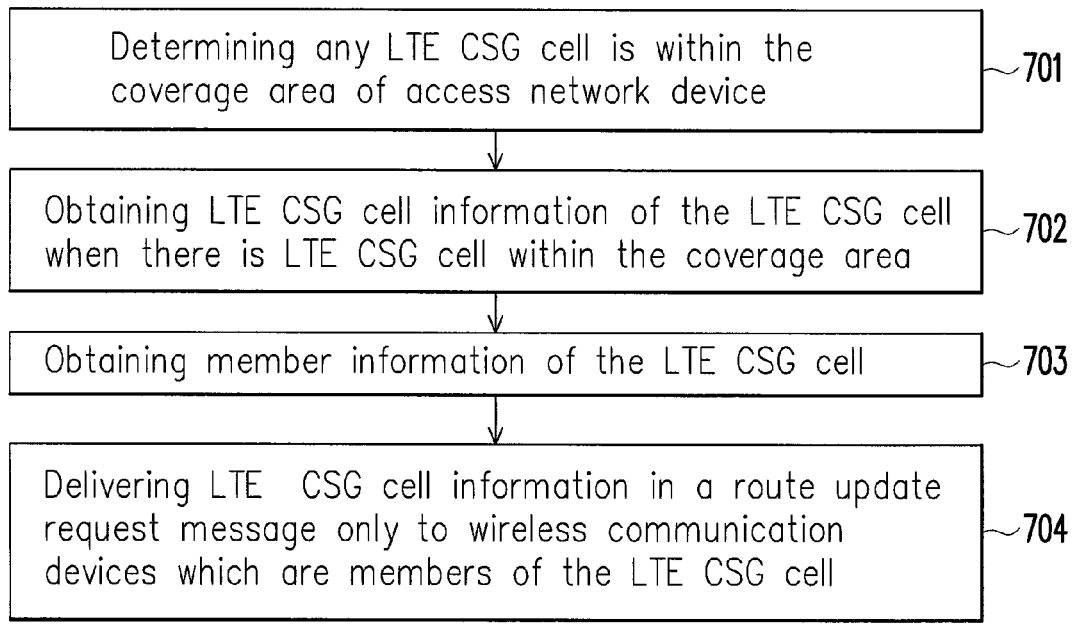
FIG. 7 is a flowchart illustrating a communication method for delivering LTE CSG cell information according to a fourth exemplary embodiment of the invention.

FIG. 7 is a flowchart illustrating a communication method for delivering LTE CSG cell information according to a fourth exemplary embodiment of the invention. Referring to FIG. 1, FIG. 2A and FIG. 7, the proposed communication method includes: the CPM 202 of the eAN device 20 determines whether there are any LTE CSG cells in its radio coverage area (step 701); the CPM 202 obtains LTE CSG cell information of the LTE CSG cell(s) when there is LTE CSG cell within the coverage are of the eAN device 20 (step 702); the CPM 202 obtains member information regarding which wireless communication device(s) belong to the LTE CSG cell within its radio coverage area (step 703); the CPM 202 only delivers the LTE CSG cell information in a route update message to at least one wireless communication device which belong to the LTE CSG cell (step 704). The fourth exemplary embodiment is helpful to those eAT which are active.

The LTE CSG cell information in the step 703 can be added into a RouteUpdateRequest message, and the LTE CSG cell information can include at least three parameters such as LTECSGInfoIncluded, LTECSGIDRange, and LTECSGEARFCN. Further, the RouteUpdateRequest message can contain the fields shown in Table I, and the technical contents of these fields can be referred to Table I.

When priority and threshold information are provided by the eAN, and the priority and the threshold information can be dedicated for an idle handoff (handover) to an LTE CSG cell. For example, priority here can refer to the LTE macro cell is given a higher priority than the LTE CSG cell. Alternatively, the LTE CSG information contained in the E-UTRAN Neighbor List Record can be reused for the LTE CSG call. For example, the eAN can deliver one specific E-UTRAN Neighbor List Record for the LTE macro cell (or the eHRPD macro cell). Also, the eAN can deliver one CSG specific message for the whole range of the LTE CSG cells.

When a proximity scheme (handoff method) is considered for the interworking between the eHRPD macro cell and the LTE CSG cell(s), an eAT may transmit a request message to the eHRPD macro cell eAN when the eAT is progressing towards an LTE CSG cell within the eHRPD macro cell coverage area, such that the eAN which receives the request message can have the mobility management procedures or the session management procedures ready for the interworking with the LTE CSG cell. The proximity scheme involved with the interworking with the LTE CSG cell can be helpful for an active handoff of an eAT from the eHRPD macro cell to the LTE CSG cell.

As previously mentioned in background of the present disclosure, it may be power consuming if an eAT keeps scanning for allowed LTE CSG cell(s) when there might be a lot of CSG cells within the eHRPD macro cell coverage area. Thus, there is proposed another communication method which adopts a layered autonomous searching method to reduce the amount of energy or the operation frequency of scanning for the LTE CSG cell(s).

Figure 8:
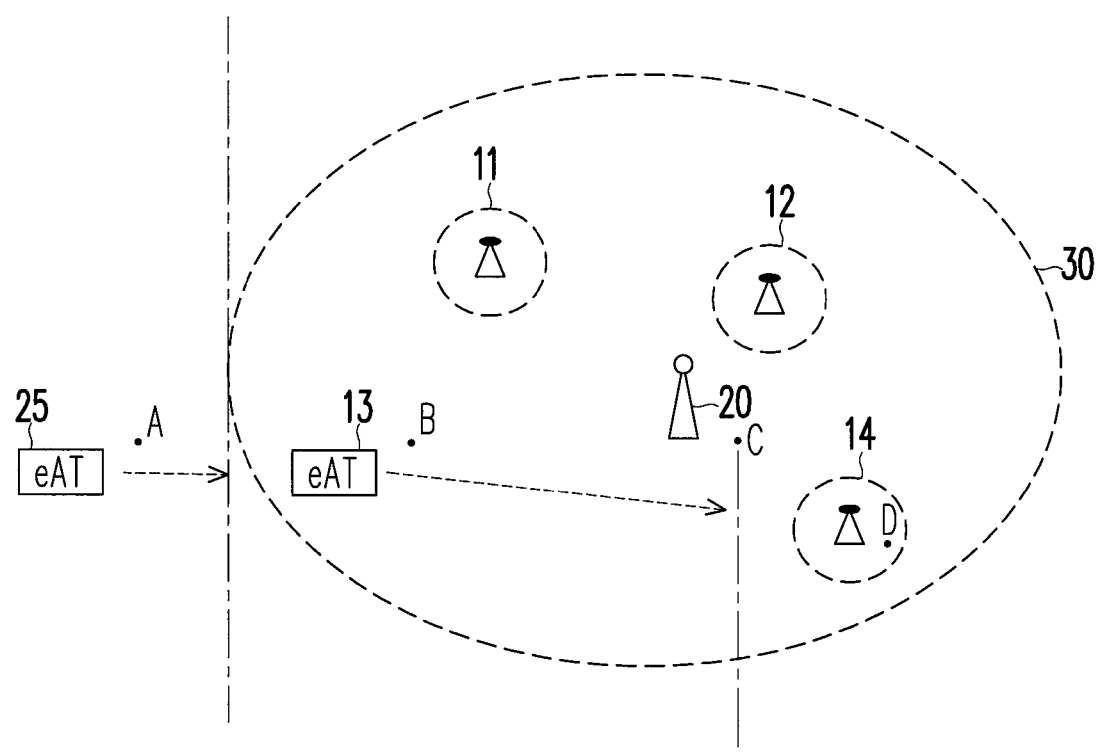
FIG. 8 is a schematic diagram illustrating a communication system according to an exemplary embodiment.

FIG. 8 is a schematic diagram illustrating a communication system according to an exemplary embodiment. Referring to FIG. 8, a communication system includes at least an eHRPD macro cell eAN device 20, and there are deployed at least LTE CSG cells 11, 12 and an allowed LTE CSG cell 14 within a (macro cell) coverage area 30 of the eAN device 20. An eAT 25 continuously moves into the coverage area of the eAN device 20, and gradually approaches the allowed LTE CSG cell 14 as indicated by a point A, a point B, a point C and a point D. The present invention is not limited to only one eAT, and there can be more eATs (not shown in FIG. 8) within the coverage area 30 of the eAN device 20. The eAN device 20 is the access network device 20 as illustrated in FIG. 2A, and can perform procedures previously illustrated in the first embodiment to the fourth embodiment. Also, each eAT within the coverage area 30 of the eAN device 20 have the same functionality of the wireless communication device 25 as illustrated in FIG. 2B.

When the eAT 25 is at the point A, the eAT 25 is outside the coverage area of the eHRPD macro cell 30, the eAT 25 stops autonomous searching (or scanning) for any LTE CSG cells. If the eAT 25 has not been searching for any LTE CSG cells, at the point A, the eAT 25 does not start scanning for any LTE CSG cells.

When the eAT 25 moves into the coverage area of the eHRPD macro cell 30, for example the eAT 25 is at the point B, the eAT 25 can know that there is an allowed LTE CSG cell which the eAT 25 can camp on through broadcast information delivered from the eAN device 20. Thus, at the point B, the eAT 25 can start autonomous searching (or scanning) for any LTE CSG cells. To be illustrated more clearly, at the point B, the eAT 25 is outside the coverage area of the allowed LTE CSG cell 14 but inside the coverage area 30 of the eAN device 20, so the eAT 25 begins to scan for the LTE CSG cell with a scanning period T1.

When the eAT 25 is at the point C, the eAT 25 keeps moving towards its allowed LTE CSG cell 14, and detects moving in proximity of the allowed LTE CSG cell 14. Thus, at the point C, the eAT 25 can begin to scan for the LTE CSG cell with a scanning period T2. In the present embodiment, the scanning period T1 is greater than the scanning period T2, such that the eAT 25 can quickly camp on the allowed LTE CSG cell 14 at the point C but saves a lot of power consumption at the point B.

When the eAT 25 is at the point D, the eAT 25 enters the coverage area of the allowed LTE CSG cell 14, and successfully camps on the allowed LTE CSG cell 14.

Figure 9:
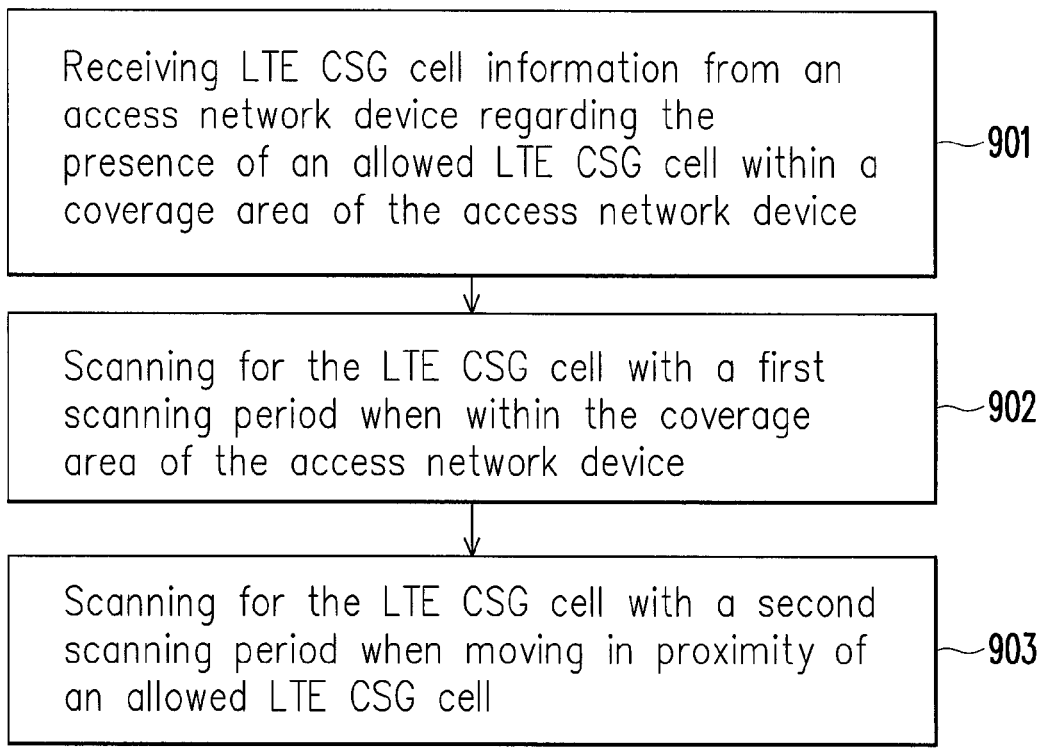
FIG. 9 is a flowchart illustrating a communication method according to a fifth exemplary embodiment of the invention.

FIG. 9 is a flowchart illustrating another communication method according to a fifth exemplary embodiment of the invention. The communication method is adapted to the eAT 25. Referring to FIG. 1, FIG. 2B and FIG. 9, the proposed communication method includes: the CPM 252 of the eAT 25 receives LTE CSG cell information from an access network device regarding the presence of an allowed LTE CSG cell within a coverage area of the access network device (step 901); the CPM 252 scans for the LTE CSG cell with a first scanning period through the transceiver module 251 when the CPM 252 detects the eAT 25 is within the coverage area of the access network device (step 902); and the CPM 252 scans for the LTE CSG cell with a second scanning period through the transceiver module 251 when the CPM 252 detects the eAT 25 is moving in proximity of the allowed LTE CSG cell (step 903).

In another embodiment alternative to the fifth exemplary embodiment, the eAT 25 can also adopt a location based solution (LBS) to calculate its distance to the allowed LTE CSG cell(s) based upon a longitude and a latitude of the eAT 25 and the allowed LTE CSG cell(s). In this embodiment, the eAT 25 can be equipped with a global positioning system (GPS) module and relevant antenna or an Assisted-GPS (AGPS) module. Thus, the eAT 25 can know whether the eAT 25 is approaching the allowed LTE CSG cell(s). A longitude and a latitude of the eAT 25 may be acquired by the GPS module of the eAT 25. Alternatively, the longitude and the latitude of the allowed LTE CSG cell(s) may be provided by the eAN device 20. Also, the longitude and the latitude of the eAT 25 can be obtained though AGPS technology with more than one eANs.

Figure 10:
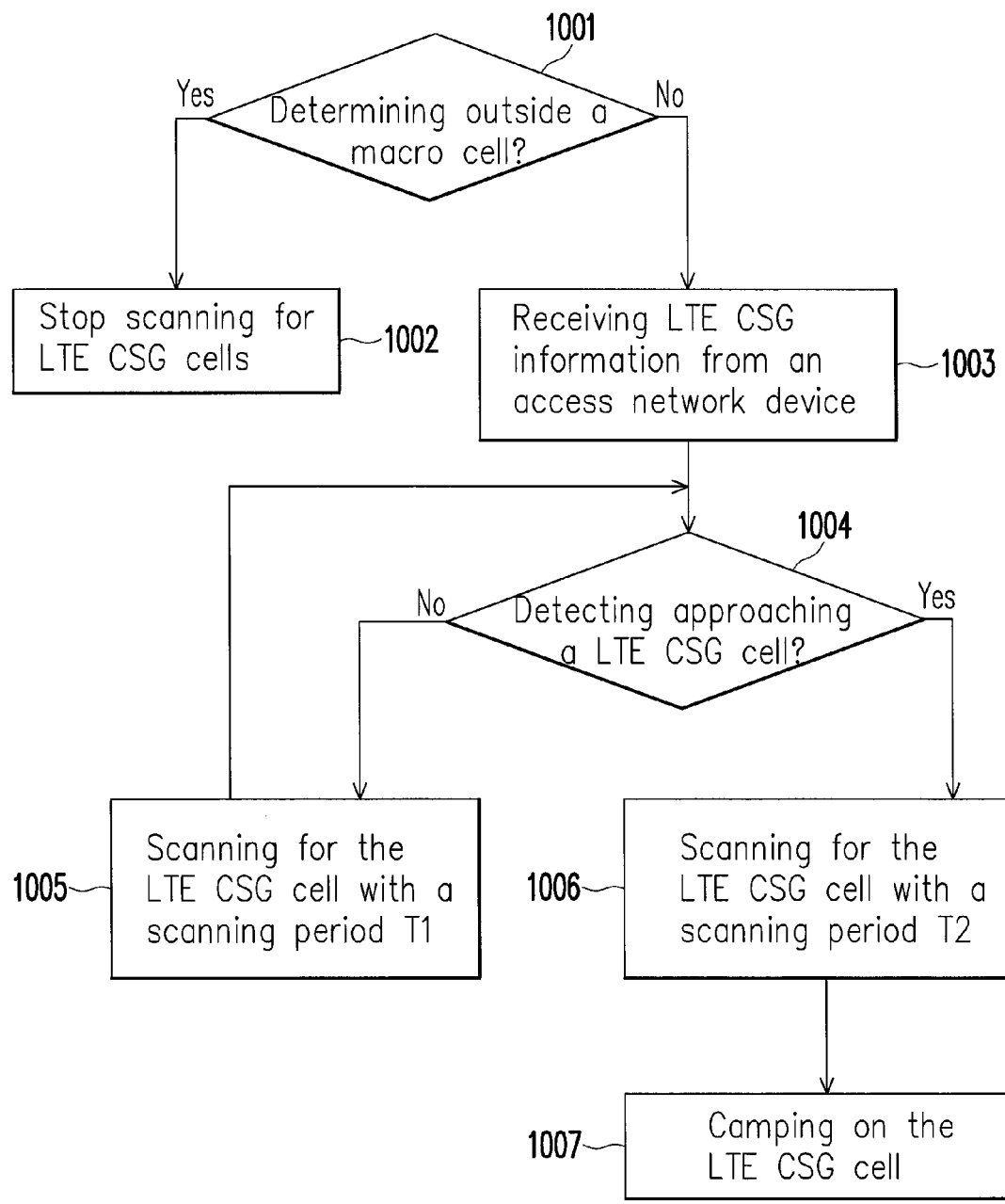
FIG. 10 is a flowchart illustrating another communication method according to a fifth exemplary embodiment of the invention.

FIG. 10 is a flowchart illustrating another communication method according to a fifth exemplary embodiment of the invention. FIG. 10 illustrates the communication method in FIG. 9 in more details. In step 1001, the CPM 252 of the eAT 25 determines whether the eAT 25 currently is outside an eHRPD macro cell coverage area 30 of the eAN device 20 through the GPS technology or the AGPS technology. In the step 1001, when the CPM 252 of the eAT 25 determines the eAT 25 is currently outside an eHRPD macro cell coverage area 30, step 1002 is executed after the step 1001; otherwise, step 1003 is executed after the step 1001. In the step 1002, the CPM 252 determines to stop scanning (or autonomous searching) for any LTE CSG cells. In the present embodiment, the step 1001 may be repeated after the step 1002.

In the step 1003, the eAT 25 moves into the eHRPD macro cell coverage area 30 and the CPM 252 receives LTE CSG information through the transceiver 251 from the eAN device 20. In step 1004, the CPM 252 detects whether the eAT 25 is approaching (in proximity of) an allowed LTE CSG cell through the GPS technology or the AGPS technology. In the step 1004, when the CPM 252 determines that the eAT 25 is approaching (in proximity of) an allowed LTE CSG cell, step 1006 is executed after the step 1004; otherwise step 1005 is executed after the step 1004.

In the step 1005, the CPM 252 scans (or autonomous searches) for the allowed LTE CSG cell with a scanning period T1 through the transceiver 251. After the step 1005, the step 1004 is executed again.

In the step 1006, the CPM 252 scans (or autonomous searches) for the allowed LTE CSG cell with a scanning period T2 through the transceiver 251, where the scanning period T1 is greater than the scanning period T2. In step 1007, the CPM 252 camps on the allowed LTE CSG cell through the transceiver 251. In the present embodiment, the step 1001 may be executed after the step 1007.

In summary, the embodiments of the present invention provide communication methods, an access network device and a communication device using the same method, and a communication system. By adopting a layered autonomous searching method, different scanning periods of searching for an allowed LTE CSG cell can be used depending upon current location of the communication device is within the macro cell coverage area or the LTE CSG cell coverage area. Further, with assistance from the access network device which delivers LTE CSG cell information relevant to scanning for the allowed LTE CSG cell, power consumption of the communication device can be greatly reduced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication method between different radio access technologies comprising a first radio access technology and a second radio access technology, applicable to an access network device of the first radio access technology to interwork with a femto cell of the second radio access technology, comprising:
   determining, at the access network device of the first radio access technology, whether one or more femto cells of the second radio access technology is present within a coverage area of the access network device;
   obtaining, at the access network device, femto cell information of the one or more femto cells of the second radio access technology determined to be present within the coverage area of the access network device; and
   delivering, by the access network device, the obtained femto cell information to one or more terminal devices within the coverage area of the access network device based on the first radio access technology, wherein the obtained femto cell information includes: an indicator value indicating that the one or more femto cells is within the coverage area of the access network device, a corresponding femto cell identifier of the one or more femto cells, and a corresponding carrier frequency of the one or more femto cells, the femto cell identifier being different from the indicator value, wherein the femto cell identifier comprises: (a) an identifier starting value that indicates an endpoint value of an identifier range, and (b) an identifier range value corresponding to a number of femto cells within the coverage area of the access network device, said identifier range value indicating a number of total identifier values of the identifier range.

2. The communication method according to claim 1, further comprising: determining the identifier range based on the endpoint value and the number of total identifier values in the identifier range, the identifier values of the identifier range being associated with corresponding femto cells of the one or more femto cells to identify the corresponding femto cells of the one or more femto cells.

3. The communication method according to claim 1, wherein delivering the femto cell information to one or more terminal devices comprises:
   delivering, at the access network device, the femto cell information only to some of the one or more terminal devices, which are one member or members of one of the one or more femto cells within the coverage area.

4. The communication method according to claim 3, wherein delivering the femto cell information only to some of the one or more terminal devices, being one member or members of one of the one or more femto cells comprises:
   obtaining, at the access network device, member information of the one or more femto cells respectively; and
   delivering, at the access network device, the femto cell information in a route update request message only to some of the one or more terminal devices, which are members of the one or more femto cells, according to the member information of the one or more femto cells.

5. The communication method according to claim 1, wherein the femto cell information further comprises priority and threshold information configured to direct a handoff operation to the one or more femto cells by the one or more terminal device.

6. The communication method according to claim 5, wherein the priority and threshold information indicates whether the access network device is prioritized over a femto cell of the one or more femto cells for communications with the one or more terminal device.

7. The communication method according to claim 1, wherein the first radio access technology adheres to a code division multiple access (CDMA) standard and the second radio access technology adheres to a Long Term Evolution (LTE) standard.

8. The communication method according to claim 2, wherein delivering the femto cell information to the one or more terminal devices comprises:
   broadcasting, at the access network device, the femto cell information to all of the one or more terminal devices within the coverage area of the access network device.

9. The communication method according to claim 8, wherein broadcasting the femto cell information to all of the one or more terminal devices within the coverage area of the access network device comprises:
   broadcasting the femto cell information in a neighbor list record message, wherein the femto cell information further comprises at least one measurement bandwidth parameter respectively corresponding to the carrier frequency, and the corresponding femto cell identifier comprises a starting value of the one femto cell identifier, and a range parameter of a femto cell identifier range.

10. The communication method according to claim 8, wherein broadcasting the femto cell information to all of the one terminal device within the coverage area of the access network device comprises:
    defining, at the access network device, the at least one femto cell as a new radio access technology type;
    creating, at the access network device, a new neighbor list record message which is contained in another RAT neighbor list according to the CDMA standard and is dedicated to carry the femto cell information for the one or more femto cells within the coverage area of the access network device; and
    transmitting, at the access network device, the new neighbor list record message to all of the one or more terminal devices within the coverage area of the access network device, wherein the femto cell information further comprises at least one measurement bandwidth parameter respectively corresponding to the carrier frequency, and the femto cell identifier comprises a starting value of the femto cell identifier, and a range parameter of a femto cell identifier range.

11. The communication method according to claim 8, wherein broadcasting the femto cell information to all of the one or more terminal devices within the coverage area of the access network device comprises:
    delivering, at the access network device, the indication of the one or more femto cells in a quick configuration message which is a system configuration message of the first radio access technology to all of the one or more terminal devices within the coverage area of the access network device; and
    delivering, at the access network device, the femto cell identifier and the carrier frequency of the one or more femto cells in a neighbor list record message to all of the one or more terminal devices.

12. The communication method according to claim 8, wherein broadcasting the femto cell information to all of the one or more terminal devices within the coverage area of the access network device comprises:
- delivering, at the access network device, the indication of the one or more femto cells in a quick configuration message which is a system configuration message of the first radio access technology to all of the one or more terminal devices within the coverage area of the access network device; and
- delivering, at the access network device, the femto cell identifier and the carrier frequency of the one or more femto cells in a new message to all of the one or more terminal devices, wherein the new message comprises a transmission cycle parameter of the new message.

13. An access network device, comprising:
a transceiver, configured to transmit signals to and receive signals from one or more terminal devices based on a first radio access technology (RAT); and
a communication protocol circuitry, operatively coupled to the transceiver, configured to:
- determine whether there is one or more femto cells of a different RAT from other network entities having the one or more terminal devices outside the coverage area of the access network device;
- obtain femto cell information of the one or more femto cells in response to the determination indicating at least one femto cell of the one or more femto cells is within the coverage area of the access network device; and
- deliver the femto cell information through the transceiver to at least one terminal device within the coverage area of the access network device based on the first RAT based on the determination whether there is the one or more femto cells of the different RAT within the coverage area of the access network device, wherein the femto cell information includes: an indicator value that indicates that the one or more femto cells is within the coverage area of the access network device, a corresponding femto cell identifier of the one or more femto cells, and a corresponding carrier frequency of the one or more femto cells, the femto cell identifier being different from the indicator value, wherein the femto cell identifier comprises: (a) an identifier starting value that indicates an endpoint value of an identifier range, and (b) an identifier range value corresponding to a number of femto cells within the coverage area of the access network device, said identifier range value indicating a number of total identifier values of the identifier range.

14. The access network device according to claim 13, wherein the first RAT follows a code division multiple access (CDMA) standard and the at least one femto cell adheres to a second radio access technology which follows a Long Term Evolution (LTE) standard.

15. The access network device according to claim 13, wherein the communication protocol circuitry broadcasts the femto cell information through the transceiver to all of the one or more terminal devices within the coverage area of the access network device.

16. The access network device according to claim 13, wherein the communication protocol circuitry delivers the femto cell information through the transceiver only to some of the one or more terminal devices, which are one member or members of one of the one or more femto cell of the one more femto cells.

17. The access network device according to claim 16, wherein:
the communication protocol circuitry broadcasts the femto cell information in a neighbor list record message, wherein the femto cell information further comprises at least one measurement bandwidth parameter respectively corresponding to the carrier frequency, and the femto cell identifier comprises a starting value of the femto cell identifier, and a range parameter of a femto cell identifier range.

18. The access network device according to claim 16, wherein:
the communication protocol circuitry defines the one or more femto cell as a new radio access technology type; and
the communication protocol circuitry transmits a new neighbor list record message which is contained in another RAT neighbor list according to the CDMA standard to all of the one or more terminal devices within the coverage area of the access network device, wherein the new neighbor list record message is dedicated to carry the femto cell information for the one or more femto cells, the femto cell information further comprises at least one measurement bandwidth parameter respectively corresponding to the carrier frequency, and the femto cell identifier comprises a starting value of the femto cell identifier, and a range parameter of a femto cell identifier range.

19. The access network device according to claim 16, wherein: the communication protocol circuitry delivers the indication of the femto cell in a quick
configuration message which is a system configuration message of the first radio access technology to all of the one or more terminal devices within the coverage area of the access network device; and
the communication protocol circuitry delivers the femto cell identifier and the carrier frequency of the at least one femto cell in a neighbor list record message to all of the at least one terminal device.

20. The access network device according to claim 16, wherein: the communication protocol circuitry delivers the indication of the one or more femto cells
in a quick configuration message which is a system configuration message of the first radio access technology to all of the one or more terminal devices within the coverage area of the access network device; and
the communication protocol circuitry delivers the femto cell identifier and the carrier frequency of the one or more femto cells in a new message to all of the one or more terminal devices, wherein the new message comprises a transmission cycle parameter of the new message.

21. The access network device according to claim 13, wherein: the communication protocol circuitry obtains member information of the one or more femto cells respectively; and
the communication protocol circuitry delivers the femto cell information in a route update request message only to some of the one or more terminal devices according to the member information of the one or more femto cells.

22. A communication system, comprising:
an access network device of a first radio access technology;
one or more terminal devices, configured to transmit signals to and receive signals from the access network device; and one or more femto cells of a second radio access technology, located within a coverage area of the access network device, wherein the access network device is configured to assist the one or more terminal devices in searching for an allowed femto cell of the one femto cells by delivering femto cell information to the one or more terminal devices within the coverage area thereof based on the first radio access technology, the delivery being in response to a determination by the access network device that the one or more femto cells is located within the coverage area of the access network device, wherein the one or more terminal devices is configured to search for the allowed femto cell based on the femto cell information, wherein the femto cell information includes: at least one indicator value that indicates that the one or more femto cells is located within the coverage area of the access network device, at least one corresponding femto cell identifier of the one or more femto cells, and at least one corresponding carrier frequency of the one or more femto cells, the at least one femto cell identifier being different from the at least one indicator value, wherein the femto cell identifier comprises: (a) an identifier starting value that indicates an endpoint value of an identifier range, and (b) an identifier range value corresponding to a number of femto cells within the coverage area of the access network device, said identifier range value indicating a number of total identifier values of the identifier range.

23. The communication system according to claim 22, wherein the first radio access technology adheres to a code division multiple access (CDMA) standard and the second radio access technology adheres to a Long Term Evolution (LTE) standard.

24. The communication system according to claim 22, wherein the access network device delivers the femto cell information only to some of the one or more terminal devices, which are one member or members of one of the one or more femto cells.

25. The communication system according to claim 22, wherein the access network device broadcasts the femto cell information to all of the one or more terminal devices within the coverage area of the access network device.

26. The communication system according to claim 22, wherein the access network device broadcasts the femto cell information in a neighbor list record message.

27. The communication system according to claim 22, wherein the access network device first defines the one or more femto cells as a new radio access technology type, creates a new neighbor list record message which is contained in another RAT neighbor list according to the CDMA standard and is dedicated to carry the femto cell information for the one or more femto cells within the coverage area thereof, and transmits the new neighbor list record message to all of the one or more terminal device.

28. The communication system according to claim 22, wherein the access network device delivers the indication of the one or more femto cells in a first message, and delivers the at least one femto cell identifier and at least one carrier frequency of the one or more femto cells in a second message to all of the one or more terminal devices within the coverage area thereof.

29. The communication system according to claim 22, wherein the at least one terminal device respectively scans for the allowed femto cell with a first scanning period when the terminal device is within the coverage area of the access network device, and scans for the allowed femto cell with a second scanning period when the terminal device detects moving in proximity of the allowed femto cell, wherein the second scanning period is greater than the first scanning period.

30. The communication system according to claim 22, wherein the one or more terminal devices respectively determines any of the at least one femto cell identifier appears in their femto cell whitelists, and then respectively scans for the femto cell whose femto cell identifier appears in the femto cell whitelists.

\* \* \* \* \*